(12) United States Patent
Medved et al.

(10) Patent No.: US 9,356,871 B2
(45) Date of Patent: May 31, 2016

(54) PROGRAMMABLE MANAGEMENT ENGINE FOR NETWORKS

(71) Applicant: CISCO TECHNOLOGY, INC., San Jose, CA (US)

(72) Inventors: Jan Medved, San Jose, CA (US); Andrew McLachlan, San Jose, CA (US); David Ward, San Jose, CA (US); David Meyer, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 355 days.

(21) Appl. No.: 13/842,774

(22) Filed: Mar. 15, 2013

(65) Prior Publication Data

US 2014/0280834 A1  Sep. 18, 2014

(51) Int. Cl.
*H04L 12/70* (2013.01)
*H04L 12/803* (2013.01)
*H04L 12/26* (2006.01)
*H04L 12/24* (2006.01)

(52) U.S. Cl.
CPC .......... *H04L 47/122* (2013.01); *H04L 41/0609* (2013.01); *H04L 43/16* (2013.01); *H04L 41/0686* (2013.01); *H04L 43/08* (2013.01)

(58) Field of Classification Search
CPC .............. H04L 29/08144; H04L 29/06; H04L 29/08072; H04L 29/08171
USPC ........................................................ 706/223
See application file for complete search history.

(56) References Cited

U.S. PATENT DOCUMENTS

| | | | | |
|---|---|---|---|---|
| 2008/0025229 A1* | 1/2008 | Beliles | ................ | H04L 63/1433 370/245 |
| 2008/0304472 A1* | 12/2008 | Gourlay | .................. | H04L 45/02 370/352 |
| 2009/0070436 A1* | 3/2009 | Dawes | .................. | G06Q 30/02 709/219 |
| 2009/0257345 A1* | 10/2009 | King | ....................... | H04L 41/22 370/216 |

(Continued)

OTHER PUBLICATIONS

Medved A. et al.: "MPLS-TP Pseudowire Configuration using OpenFlow 1.3; draft-medved-pwe3-of-config-01.txt", Internet Engineering Task Force, (IETF); Standardworkingdraft, Internet Society (ISOC) 4, Rue Des Falaises CH-1205 Geneva, Switzerland, Jul. 11, 2012, pp. 1-20.

(Continued)

*Primary Examiner* — Philip Chea
*Assistant Examiner* — Wuji Chen
(74) *Attorney, Agent, or Firm* — Patterson +Sheridan LLP

(57) ABSTRACT

A network node may contain a virtual software-defined networking (SDN) switch and a local a management engine (e.g., a software application) for generating performance metrics based on received management plane traffic. Specifically, the virtual SDN switch may identify and forward received management plane traffic to the local management engine. In turn, the management engine evaluates the management plane traffic to generate performance metrics without forwarding the management plane packets to the remote SDN controller. The management engine may compare the metrics to one or more thresholds to determine the current state or health of the data paths in a network. If a threshold is exceeded, the management engine may transmit an alert to the virtual SDN switch to perform a corrective action—e.g., using a backup data path after the primary data path fails.

19 Claims, 4 Drawing Sheets

(56) References Cited

U.S. PATENT DOCUMENTS

| | | | | |
|---|---|---|---|---|
| 2012/0173928 A1* | 7/2012 | Bohrer | G06F 11/3648 | 714/28 |
| 2013/0010600 A1* | 1/2013 | Jocha | H04L 43/026 | 370/236.2 |
| 2013/0205415 A1* | 8/2013 | McKee | G06F 8/24 | 726/30 |
| 2014/0153441 A1* | 6/2014 | Frey | H04L 43/50 | 370/255 |

OTHER PUBLICATIONS

International Search Report for PCT/US2014/022066, Jun. 25, 2014.

* cited by examiner

PROGRAMMABLE MANAGEMENT ENGINE FOR NETWORKS

TECHNICAL FIELD

Embodiments presented in this disclosure generally relate to handling management plane traffic in a software-defined networking element, and more specifically, to using a local management engine or controller for handling management plane traffic.

BACKGROUND

Software-defined networking (SDN) is an approach to networking in which control is decoupled from hardware and given to a software application, referred to herein as a SDN controller. Conventionally, when a packet arrives at a network device in a typical network, the control plane, which is based on the switch's proprietary firmware, tells the device where to forward the packet. In some network devices, the control plane may be configured to recognize different types of packets and treat them differently, such as forwarding the packets to different network devices or dropping the packets if certain criteria are met.

In a SDN enabled network, a network administrator can change how the network devices route data packets using a software application without having to, for example, send a technician to the individual network devices. The administrator can remotely reconfigure the rules in the control plane of the network devices—e.g., prioritizing, de-prioritizing or even blocking specific types of packets—using the SDN controller. A SDN enabled network may allow the administrator to manage traffic loads in a flexible and more efficient manner relative to conventional network devices that use control planes based on firmware.

Moreover, SDN allows a network administrator to configure a switching fabric across multi-vendor hardware and different proprietary firmware. One standard that permits a network administrator to remotely configure and control the control plane of network devices is the OpenFlow® standard (OpenFlow is a trademark of the Open Networking Foundation). Generally, OpenFlow lets network administrators control routing tables for a plurality of network devices using a single SDN controller.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION

Overview

Figure 1:
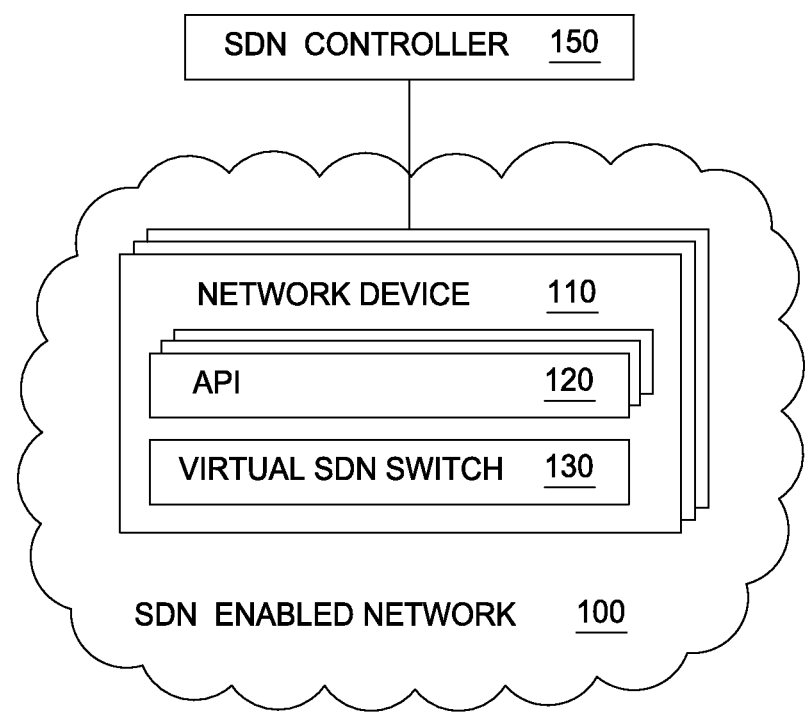
FIG. 1 illustrates a SDN enabled network, according to one embodiment described herein.

Embodiments of the present disclosure include a method and a computer program product that receives management plane traffic at a software-defined networking (SDN) switch on a network node in a computer network. The method and computer program product forwards the management plane traffic from the SDN switch to a management engine executing in the network node and generates, at the management engine, one or more performance metrics associated with the computer network based on the management plane traffic. The method and computer program product receives, at the SDN switch, a management plane packet from the management engine. The method and computer program product forwards the management plane packet to a neighboring node in the computer network.

Another embodiment of the present disclosure is a physical network node including a management engine configured to generate one or more performance metrics associated with a computer network. The network node also includes an SDN switch configured to receive management plane traffic from a first neighboring node in the computer network and forward the management plane traffic to the management engine. Furthermore, the SDN switch is configured to receive a management plane packet from the management engine and forward the management plane packet to a second neighboring node in the SDN enabled environment.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

Description of Example Embodiments

Software-defined networking (SDN), in general, provides additional flexibility and solidarity relative to conventional networks. Using an SDN controller, which may be either centrally located or located on the respective network devices, a network administrator can configure the control plane and dictate how the network devices route data. For example, the network administrator may assign criteria or SDN rules that, when satisfied, instruct the network device to perform a specific action on the received packet—e.g., drop the packet, forward the packet to a particular network device, evaluate the packet using an application on the network device, and the like. In one embodiment, the SDN controller configures the routing table or forwarding table (i.e., forwarding information base) in a network device based on the network administrator's preferences.

After receiving a packet on an ingress port, a network device in the SDN enabled network may evaluate the packet to determine what action to take. The network devices may rely on the different headers of the packet—e.g., source and destination addresses, security group tag, MAC-layer priority value, VLAN ID, etc.—to determine the action. Alternatively or additionally, the network device may perform a deep packet inspection to determine what action is appropriate. By matching the packets to a packet field in a SDN rule, the network device is able to identify an action to take regarding the packet.

Management plane traffic, however, introduces complexity into a SDN enabled network. For example, if the system administrator wishes to abstract the management plane so it, like the control plane, can be managed by a software application, the network devices may transmit the management plane traffic (e.g., operation/administration/management packets, quality-of-service (QoS) packets, other analytics packets) to the SDN controller (or other software application) which evaluates the packets and determines the appropriate action. However, the SDN controller is typically remotely located from the network devices. If a management plane packet indicates, for example, that a link between two network devices has failed, the network device forwards the packet to the SDN controller which evaluates the packet and sends back an instruction such as re-routing traffic on a redundant network link. The time required to transmit the management plane traffic to the SDN controller, process the appropriate result, and receive the result may take up to several seconds. During this time, the network device may have had to drop packets or stall the data flows.

Instead, the network device may include a management engine (e.g., a software application) executing at the network device. A virtual SDN switch in the network device may forward management plane traffic to the local management engine which evaluates and determines the appropriate result without forwarding the management plane packets to a remote controller. In addition, the network device may be modified by adding a processor for executing the management engine. Non-SDN enabled network devices include application-specific integrated circuits (ASICs) that perform the function of the management engine. However, these ASICs are costly and are customized according to the hardware used by each vendor. In contrast, the management engine may be loaded onto any typical network device and may be executed using a generic, off-the-shelf processor. Doing so enables the management plane, in addition to the control plane, to be abstracted, and thus, controlled by a software application—e.g., the SDN controller.

In one embodiment, the network administrator may use the SDN controller to program or configure the management engine as desired. Once configured, the management engine is delegated the task of evaluating the management plane traffic which avoids having to transmit these packets to the SDN controller. If the network administrator wishes to reconfigure the management engines, she can use the SDN controller to simply push out updates to the management engines executing on the network devices. In a non-SDN environment, reconfiguring how a network device handles management plane traffic requires accessing each network device individually and using command line interface (CLI) instructions specific to the particular device and vendor.

In one embodiment, the management engine may be an operations, administration, and management (OAM) engine or application executing on the network device. Specifically, the network device may host a virtual SDN switch which receives ingress packets and determines, based on SDN rules, how to handle the packets—e.g., forwards the packets to another network device, alters the packets, discards the packets, etc. The virtual SDN switch may also include logic for identifying OAM packets that are part of the management plane. The virtual SDN switch forwards the OAM packets to the local OAM engine or controller. The OAM engine may perform typical OAM actions such as determining a state or health of the different physical links or virtual paths between network devices and circuit end points. The result of the OAM processing may then be transmitted to the virtual switch which may act on the results—e.g., using a redundant link if a particular link fails. Additionally, the OAM engine may generate additional OAM packets that the virtual SDN switch may then transmit to OAM engines on other network devices.

In one embodiment, the OAM engine is a software application that uses a generic, off-the-shelf processor for execution. For example, the network administrator may add the generic processor, which may be contained within a blade or an expansion card, to the network device. The OAM engine may then be loaded into the memory of the network device and use the generic processor to execute.

FIG. 1 illustrates a SDN enabled network 100, according to one embodiment. As shown, the SDN enabled network 100 is coupled to a SDN controller 150. A network administrator may reconfigure the rules of the control planes in the network devices 110 using the SDN controller 150 in order to prioritize, de-prioritize, or block specific types of packets. Specifically, the SDN controller 150 may configure a virtual SDN switch 130 based on SDN rules. In one embodiment, the virtual SDN switches 130 may contain flow tables that contain the SDN rules provided by the SDN controller 150 in order to handle received packets.

In one embodiment, the network devices 110 within the SDN enabled network 100 may be different devices manufactured by different vendors. As such, the control planes of the network devices 110 may be controlled by proprietary firmware that is specific to each device 110. To abstract the control plane such that the SDN controller 150 can establish and monitor the virtual SDN switch 130, network devices include one or more application programming interfaces (APIs) 120. The APIs 120 may serve as a communication layer between the virtual SDN switch 130 (a software driven application) and the underlying hardware/firmware of the network device 110. Because the APIs 120 can be customized to interface with the proprietary firmware or hardware of the network device 110, the same SDN switch 130 may be executed on all the network devices 110, irrespective of the product's vendor. In this manner, SDN switch 130 may use APIs 120 to gather data associated with the different functions of the network device 110, such as statistics associated with the network device 110, routing tables, status of the device 110, topology information, errors, and the like. Moreover, APIs 120 may also permit a programmer or network administrator to control the functions of the network device 110 such as change settings in the forwarding engine, change the state of the device 110, etc. Stated generally, APIs 120 may permit SDN switch 130 to control the underlying hardware elements of the network device 110. In this manner, the SDN controller 150 can establish the same virtual SDN switch 130 on a plurality of network devices 110 and update the SDN switches 130 without considering the underlying firmware/hardware of the devices 155. One such product that permits the abstraction of the control plane using APIs 120 is the One Platform software development kit (SDK) by Cisco® (a registered trademark in the United Stated many other jurisdictions).

Figure 2:
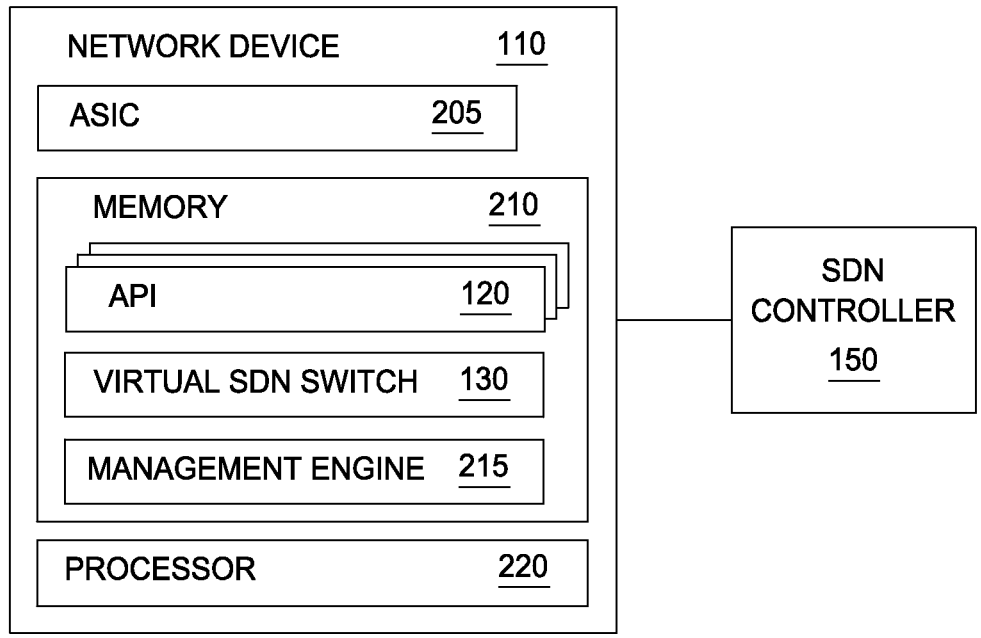
FIG. 2 illustrates a network device with a local management engine, according to one embodiment described herein.

FIG. 2 illustrates a network device 110 with a local management engine, according to one embodiment. Network device 110 includes an ASIC 205. As discussed above, ASIC 205 may be vendor specific such that the design of ASIC 205 varies between network devices 110 in the SDN enabled network. For example, in non-SDN enabled networks, ASIC 205 and its accompanying firmware may manage the control and management plane traffic for the network device. However, to use the network device 110 in a SDN enabled network, one or more APIs 120 are loaded in the memory 210 of the device 110 to abstract the control plane. SDN switch 130 may then use the information provided by the APIs 120 to configure the control plane—e.g., change how data packets are routed through the network device 110.

In one embodiment, the APIs 120 may also be used to abstract the management plane. That is, the APIs 120 decouple the management plane from exclusive control by ASIC 205 and its accompanying firmware. The management plane of each network device 110 may be grouped and considered as a network-wide management plane that can be controlled by a management service. As shown here, network device 110 includes a management engine 215 which, in one embodiment, is a software application loaded into memory 210. If desired, the network administrator may load the management engine 215 into each network device 110 in a SDN enabled network. The network administrator may use SDN controller 150 to program and configure each management engine 215. In this manner, the management engines 215 form an abstraction layer such that the network administrator can treat the individual management planes of the network devices 110 as a single, shared management plane.

Instead of the directly controlling or configuring the management engine 215 with the SDN controller 150, other mechanism in a SDN environment may program and configure management engine 215. For example, an operating system executing on the network device 110 may be tasked with programming the local maintenance engine 215. For example, SDN controller 150 may transmit a request to network device 110 to begin executing the management engine 215. Nonetheless, the operating system (or some other mechanism or application) may directly program and initiate the management engine 215 in response to the request.

Moreover, network device 110 includes processor 220. In one embodiment, processor 220 may be a supplemental processor that is added to the network device 110 after being manufactured. For example, the processor 220 may be contained within an expansion card or blade that is coupled to the network device 110. Generally, processor 220 may be any processor capable of executing the functions of the management engine 215. In one embodiment, the processor 220 may be a generic CPU that, unlike ASIC 205, is not designed to perform a specific function such as data routing but is designed to process instructions from any type of application based on a standardized instruction set architecture (ISA)—e.g., x86 or PowerPC® (a registered trademark of International Business Machines in the United States and other countries).

By adding processor 220 to network device 110, the device 110 can be upgraded to permit the management engine 215 to be hosted on the network device 110. For example, in some embodiments, ASIC 205 may be unable to execute the management engine 215. In this scenario, the network administrator may add processor 220 to the network device 110 to enable the management engine 215 to execute on the device 110. Accordingly, a typical Ethernet network device 110 may be upgraded to support a local, software management engine 215 without having to re-design the ASIC 205. Further still, in some embodiments, the network administrator may add additional memory 210 to the network device 110 to provide adequate storage for the management engine 215.

Figure 3:
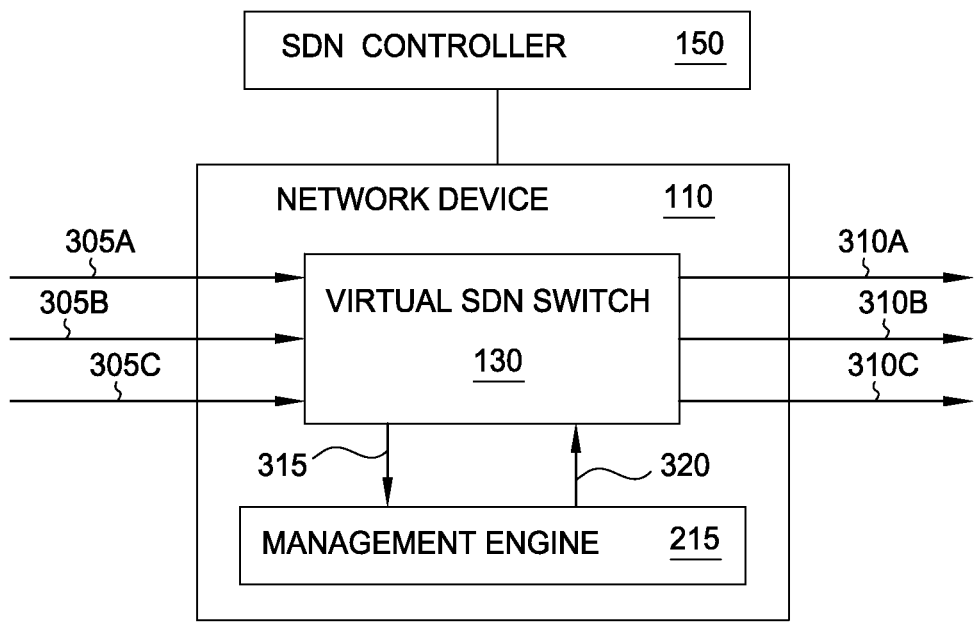
FIG. 3 illustrates a virtual switch and a local management engine, according to one embodiment described herein.

FIG. 3 illustrates a virtual SDN switch 130 and a local management engine 215 in operation, according to one embodiment. As shown, network device 110 has three ingress data paths 305A-C and three egress data paths 310A-C. These data paths 305, 310 may be separate logical data paths on the same physical link (e.g., three VLANs traveling on the same cable) or may represent three different physical links (e.g., three cables or three optical fibers). Of course, network device 110 may have many more data paths than the ones shown.

SDN switch 130 may have one or more tables that store the SDN rules provided by SDN controller 150. Generally, these rules configure the control plane and how the network device 110 routes data. For example, the rules may prioritize, de-prioritize or even block specific types of packets and determine the next hop (if any) for the packets. That is, SDN switch 130 contains the control plane logic which governs how packets flow from the ingress paths 305 to the egress paths 310.

In one embodiment, SDN switch 130 contains logic for identifying management plane traffic. Specifically, when defining the rules for the control plane, the SDN controller 150 may configure SDN switch 130 to identify management plane packets and forwards these packets to management engine 215 as shown by arrow 315. Generally, the management plane carries the operations and administration traffic required for network management. This may include OAM packets, QoS packets, and the like. The management engine 215 may use the packets to determine the current state of the network based on certain metrics gathered by evaluating the management plane traffic such as throughput, number of dropped packets, errors, latency, jitter, out-of-order delivery, and the like. Based on these metrics, the management engine 215 may update the control plane—i.e., the rules contained in the virtual SDN switch 130. For example, if data path 310C fails, the management engine 215 may instruct SDN switch 130 to use a backup data path. In another embodiment, instead of transmitting instructions to SDN switch 130, management engine 215 may report the failure to SDN switch 130 which then determines how to handle the failure—e.g., whether to drop the packets associated with a non-functioning data path or re-route the packets using a backup data path.

As shown by arrow 320, management engine 215 may also send to SDN switch 130 additional management plane traffic to be transmitted on egress data paths 310 to neighboring management engines 215. That is, in addition to receiving the management plane packets, the management engine 215 may transmit management plant packets (or forward the already received packets) to other neighboring engines 215. SDN switch 130 receives the management plane packets from management engine 215 and forwards these packets (along with the data plane and control plane traffic) on the egress data paths 310. The neighboring management engines may use the received packets to develop similar metrics about the state of the network.

Executing a local copy of the management engine 215 on a network device 110 avoids transmitting the management plane traffic to a remote SDN controller. For example, if the management engine is located on the SDN controller 150, then the SDN switch 130 must forward the received management plane traffic to the SDN controller 150 which determines the current state of the network. If the management engine on the SDN controller 150 determines that SDN switch 130 should use a backup data path because the primary data path is dropping too many packets, the SDN switch 130 must wait until this instruction is received from SDN controller 150. Meanwhile, additional packets may have been dropped and service may be disrupted.

In one embodiment, SDN switch 130 may continue to forward some management plane traffic to SDN controller 150 while other management plane traffic is forwarded to the local management engine 215. For example, some of the OAM or QoS packets may not be time sensitive. These packets may be transmitted to the SDN controller 150 for processing by management engine located there while time-sensitive management plane traffic is forwarded to management engine 215.

Figure 4:
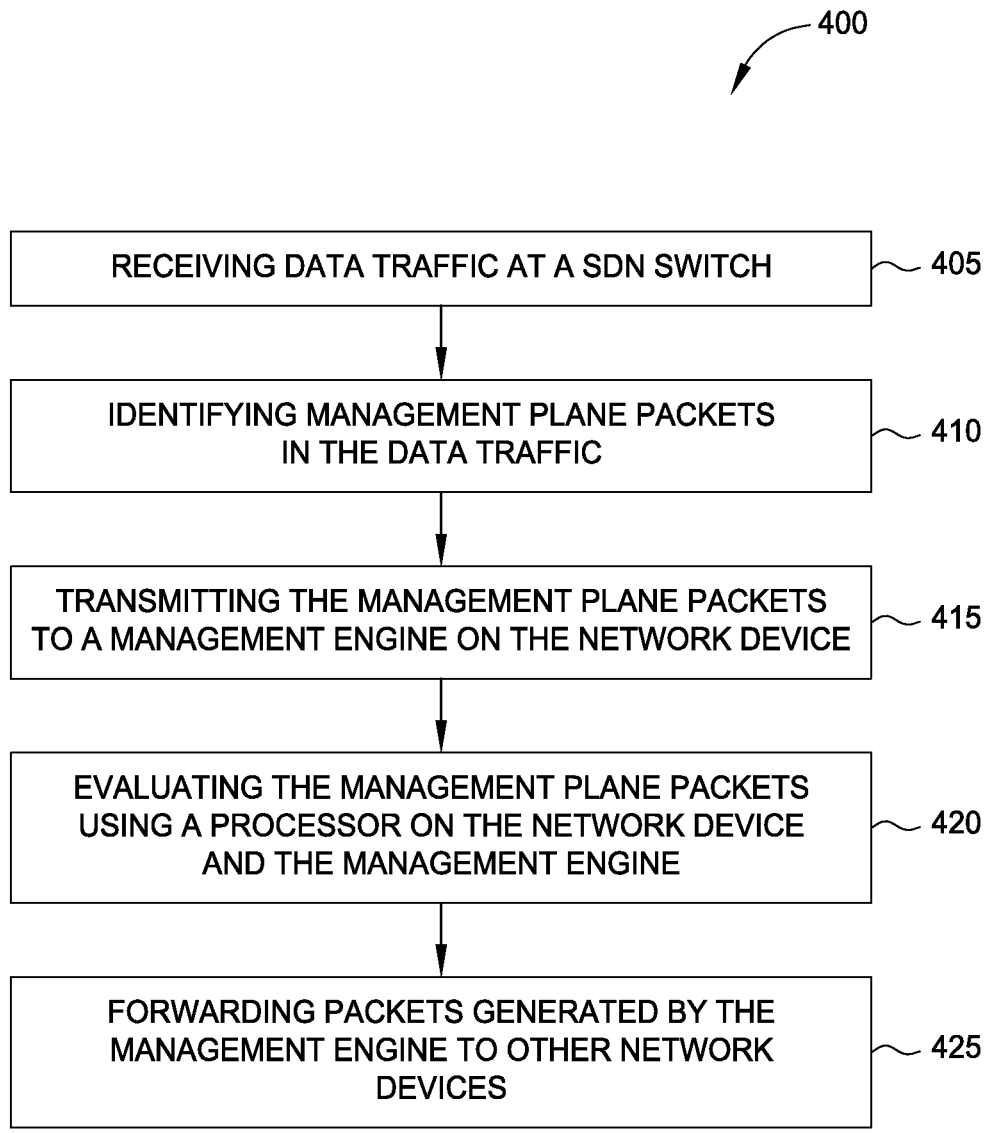
FIG. 4 illustrates a method for handling management plane traffic in a SDN environment, according to one embodiment described herein.

FIG. 4 is a method 400 for handling management plane traffic in a SDN environment, according to one embodiment. At block 405, a virtual SDN switch hosted in a network device receives data traffic on an ingress port. The data traffic may include a mix of data, control, and management plane traffic. At block 410, the SDN switch may identify the management plane traffic from the rest of the network traffic flowing through the port. For example, the SDN switch may monitor each port in a network node and identify the different packets or frames associated with the management plane.

At block 415, the SDN switch transmits the management plane traffic to a management engine located on the network device. For example, the management engine may be software application that, like the SDN switch, is configurable by a remote SDN controller. The network device may use, for example, a plurality of APIs to abstract the control and management planes of the network devices so that a single SDN controller can monitor and configure these planes on various network devices that are manufactured by different vendors and use different firmware or hardware designs.

At block 420, the management engine evaluates the management plane packets using a processor on the network device. In some embodiments, the network device may not have a processor capable of executing the management engine (e.g., a software application). Nonetheless, a supplemental processor may be added to the network device which is capable of executing the management engine. To minimize costs, the processor may be a generic processor configurable to execute instructions based on an ISA.

The management engine may compute different metrics based on the management plane traffic. These metrics may be related to OAM, QoS, and the like. The management engine may issue different alerts based on these metrics. Specifically, the SDN controller may provide thresholds that the management engine compares to the different metrics. If, for example, the number of management packets being dropped exceeds a corresponding threshold, the management engine may issue an alert to the SDN switch. In response, the SDN switch may alter the SDN rules the switch uses to forward the data plane traffic—i.e., the SDN switch may alter the control plane logic used to route the data plane traffic.

At block 425, the management engine may generate and transmit management plane packets to the SDN switch, which in turn, forwards these packets to neighboring network nodes (e.g., connected network devices) via virtual and physical links. For example, the management engine may return received management plane packets to the SDN switch to be forwarded back to an originating management engine, as in the case of echo-mode management traffic. The SDN switches on those neighboring nodes may identify the management plane packets and send them to their own local management engines. These engines may also be configurable using the SDN controller.

If, for example, the management engine is an OAM engine, the engine may, at intervals, transmit time-stamped packets or transmit packets with a defined ordering so that a neighboring OAM engine can use the data in the packets to determine the current status of the link connecting the two network nodes. In this manner, the management plane traffic in a SDN network environment can be handled by the local management engines hosted on the network nodes without having to transmit the packets to a remote controller for evaluation. Nonetheless, the SDN controller may be used to configure the shared management plane by programming the management engines—e.g., pushing out updates to the different management engines, altering the thresholds used by individual management engines for evaluating the derived metrics, and the like.

Figure 5:
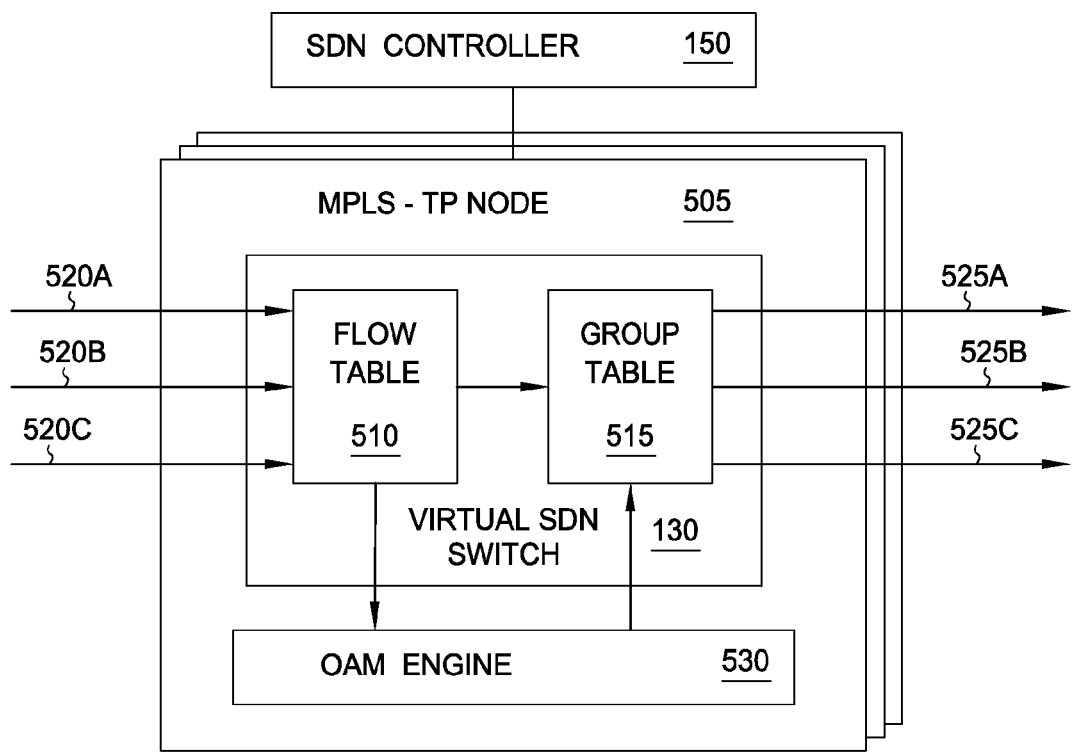
FIG. 5 illustrates a local operations, administration, and maintenance engine in a network device, according to one embodiment described herein.

FIG. 5 illustrates a local OAM engine 530 in a network device with a virtual SDN switch 130, according to one embodiment. As shown here, the network device may be a multiprotocol label switching transport profile (MPLS-TP) node 505 that may use one or more optical fiber links for transmitting and receiving network traffic from neighboring MPLS-TP nodes. In one embodiment, the MPLS-TP node 505 may be, for example, an Ethernet switch. The MPLS-TP node 505 may have one or more transport Label Switched Path (LSP) links (i.e., a virtual link) connecting node 505 to another MPLS-TP node in the SDN enabled environment. The network traffic in each LSP may be logically divided into different data streams (commonly referred to a pseudowires (PW)). For example, to segregate date, each customer may be assigned a different PW; nevertheless, the PWs may all travel on the same transport LSPs.

The OAM engine 530 may monitor the current state of the LSPs and PWs in the SDN enable network. To do so, the various MPLS-TP nodes 505 may transmit OAM packets (i.e., management plane packets) between the nodes 505. Each node 505 may include a local OAM engine 530 which evaluates the OAM packets to determine metrics associated with the LSPs and PWs. For example, a customer may desire that the PW have a certain reliability (i.e., a maximum amount of dropped packets in a particular network hop). The SDN controller 150 may instruct the OAM engines 530 to determine whether the number of dropped packets in a particular PW exceeds this threshold. If so, the OAM engine 530 may issue an alert to the virtual SDN switch 130. In other embodiments, OAM engine 530 may issue alerts based on metrics associated with throughput, errors, latency, jitter, out-of-order delivery, and the like.

SDN switch 130 includes a flow table 510 and a group table 515. The SDN controller 150 may populate the flow table 510 with one or more SDN rules. As packets are received along data paths 520A-C, which represent either PWs or LSPs, the SDN rules in the flow table 510 determine what corresponding action to take with the packets. For example, the packets may be dropped, prioritized, sent to another application for processing, altered, forwarded, and the like. In one embodiment, virtual SDN switch 130 may be compatible with the OpenFlow® standard (an open source control plane abstraction protocol).

In one embodiment, each SDN rule defines a set of packet fields to match and a corresponding action (such as send-out-port, modify-field, drop the packet, etc.). As a new packet is received, SDN switch 130 compares the packet to the packet fields in the SDN rules to determine if there is a match (e.g., the SDN switch 130 performs a flow-match operation). If so, SDN switch 130 performs the action corresponding to the matched rule. If, however, a received packet does not match one of the packet fields, SDN switch 130 may send the packet to the SDN controller 150. The controller 150 may decide to drop the packet or send a new SDN rule entry to the flow table 510 for handling the packet (as well as other subsequent packets that match the packet field).

If the flow table 510 determines to forward the packet to a neighboring node 505, SDN switch 130 passes the packet to group table 515 which determines the appropriate data path 525A-C to use when forwarding the packet. Specifically, the group table 515 may assign a virtual port to use when forwarding the packet.

Flow table 510 may also include a SDN rule for identifying OAM packets based on a specific packet field and passing the identified OAM packets to the local OAM engine 530 for evaluation. As described above, the OAM engine 530 may generate metrics concerning the current state of a LSP or PW based on the OAM packets, compare the metrics to one or more thresholds, and issue an alert or instruct the SDN switch to perform a corrective action if the metric exceeds the threshold. Additionally, the OAM engine 530 may generate new OAM packets (or forward received packets) that SDN switch 130 then transmits to neighboring nodes 505 using data paths 525A-C.

If the OAM engine 530 issues an alert to the SDN switch 130, the group table 515 may be tasked with determining the appropriate action. For example, if the OAM engine 530 reports that a LSP has been severed, the group table 515 may move traffic from a virtual port associated with the severed transport LSP to a virtual port associated with a backup transport LSP. In this manner, OAM management plane traffic may be evaluated, and corrective actions may be performed without having to transmit any data to the SDN controller.

However, in other embodiments, some management plane traffic may flow between the MPLS-TP node 505 and the SDN controller 150. For example, for corrective actions that are not time critical, the SDN switch may forward alerts to the SDN controller which may determine what action to perform—e.g., the SDN switch may provide a new SDN rule to the flow table 510 or reconfigure the group table 515 to route traffic using a different virtual port. Moreover, the OAM engine 530 may have varying complexity. That is, to reduce cost by being able to use a low-cost processor for executing the OAM engine 530, the engine 530 may generate the metrics and compare these metrics to predefined threshold but may not determine the corrective action. Instead, the SDN switch may determine the corrective action to take. However, in other embodiments, the OAM engine 530 may have the necessary logic for determining what action to take. For example, instead of transmitting an alert to the SDN switch, the OAM engine 530 may reconfigure the group table 515 directly.

Although FIG. 5 illustrates placing an OAM engine on a MPLS-TP node executing a virtual SDN switch, the embodiments are not limited to such. In other embodiments, the engine may be a QoS engine or some combination of QoS and OAM.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

CONCLUSION

Instead of transmitting management plane traffic to an SDN controller, the network device may be configured to include a management engine (e.g., a software application) executing at the network device. A virtual SDN switch on the network device may identify and forward management plane traffic to the local management engine. In turn, the management engine generates performance metrics without forwarding the management plane packets to the remote SDN controller. In addition, the network device may be modified by adding a processor for executing the management engine. Non-SDN enabled network devices include application-specific integrated circuits (ASICs) that perform the function of the management engine. However, these ASICs are costly and are customized according to the hardware used by each vendor. In contrast, the management engine may be loaded onto any typical network device and may be executed using a generic, off-the-shelf processor. Doings so enables the management plane, in addition to the control plane, to be abstracted, and thus, managed by the SDN controller.

In one embodiment, the network administrator may use the SDN controller to program or configure the management engine as desired. Once configured, the management engine is delegated the task of evaluating the management plane traffic which avoids having to transmit these packets to the SDN controller. If the network administrator wishes to reconfigure the management engines, she can use the SDN controller to simply push out updates to the management engines executing on the network devices. In a non-SDN environment, reconfiguring how a network device handles management plane traffic requires accessing each network device individually and using CLI instructions specific to the particular device and vendor.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving management plane traffic at a software-defined networking (SDN) switch on a network device in a computer network;
forwarding the management plane traffic from the SDN switch to a management engine executing on a processor in the network device,
generating, at the management engine, one or more performance metrics associated with the computer network based on the management plane traffic;
receiving, at the SDN switch, a management plane packet from the management engine;
forwarding the management plane packet to a neighboring device in the computer network; and
performing data plane traffic switching using an application-specific integrated circuit (ASIC) that is separate from the processor.

2. The method of claim 1, further comprising:
separating the management plane traffic from received data plane traffic based on comparing a packet field in the management plane traffic to a SDN rule contained in the SDN switch.

3. The method of claim 1, wherein the SDN switch comprises a table containing a plurality of SDN rules, each of the SDN rules comprising a packet field and a corresponding action to be performed by the SDN switch if a received packet matches the packet field.

4. The method of claim 1, further comprising:
comparing the one or more performance metrics to respective thresholds using the management engine; and
upon determining that the at least one metric exceeds one of the respective thresholds, issuing an alert from the management engine to the SDN switch to perform a corrective action.

5. The method of claim 4, wherein, in response to the alert, the SDN switch updates a group table such that data previously assigned a first virtual port of a primary data link is assigned to a second virtual port of a backup data link.

6. The method of claim 1, wherein both the SDN switch and the management engine are communicatively coupled to a SDN controller located remotely from the network device, wherein the control plane of the network device is abstracted and shared by a plurality of network devices in the computer network, wherein the SDN controller is capable of managing and configuring the shared control plane of the plurality of network devices remotely.

7. The method of claim 1, wherein the management engine is a software application and is at least one of an operations, administration, and management (OAM) engine and quality-of-service (QoS) engine, and wherein the network device is an Ethernet switch configured as a multiprotocol label switching transport profile (MPLS-TP) node.

8. A computer program product comprising:
computer code that receives management plane traffic at a software-defined networking (SDN) switch on a network device in a computer network;
computer code that forwards the management plane traffic from the SDN switch to a management engine executing on a processor in the network device;
computer code that generates, at the management engine, one or more performance metrics associated with the computer network based on the management plane traffic;
computer code that receives, at the SDN switch, a management plane packet from the management engine;
computer code that forwards the management plane packet to a neighboring device in the computer network; and
computer code that performs data plane traffic switching using an application-specific integrated circuit (ASIC) that is separate from the processor, wherein the computer code is stored in a non-transitory computer storage medium.

9. The computer program product of claim 8, further comprising:
computer code that separates the management plane traffic from received data plane traffic based on comparing a packet field in the management plane traffic to a SDN rule contained in the SDN switch.

10. The computer program product of claim 8, wherein the SDN switch comprises a table containing a plurality of SDN rules, each of the SDN rules comprising a packet field and a corresponding action to be performed by the SDN switch if a received packet matches the packet field.

11. The computer program product of claim 8, further comprising:
computer code that compares the one or more performance metrics to respective thresholds in the management engine; and
computer code that, upon determining that the at least one metric exceeds one of the respective thresholds, issues an alert from the management engine to the SDN switch to perform a corrective action.

12. The computer program product of claim 11, wherein, in response to the alert, the SDN switch updates a group table such that data previously assigned a first virtual port of a primary data link is assigned to a second virtual port of a backup data link.

13. The computer program product of claim 8, wherein both the SDN switch and the management engine are communicatively coupled to a SDN controller located remotely from the network device, wherein the control plane of the network device is abstracted and shared by a plurality of network devices in the computer network, wherein the SDN controller is capable of managing and configuring the shared control plane of the plurality of network devices remotely.

14. A network device, comprising:
an application-specific integrated circuit (ASIC) configured to perform data plane traffic switching;
a management engine configured to generate one or more performance metrics associated with a computer network;
a supplemental processor configured to execute the management engine, wherein the supplemental processor is based on an instruction set architecture (ISA);
an SDN switch configured to receive management plane traffic from a first neighboring device in the computer network and forward the management plane traffic to the management engine,
wherein the SDN switch is configured to receive a management plane packet from the management engine and forward the management plane packet to a second neighboring device in the SDN enabled environment.

15. The network device of claim 14, wherein the SDN switch is configured to separate the management plane traffic from received data plane traffic based on comparing a packet field in the management plane traffic to a SDN rule contained in the SDN switch.

16. The network device of claim 14, wherein the supplemental processor is connected to the network device via one of a blade and an expansion card.

17. The network device of claim 14, wherein the SDN switch comprises a table containing a plurality of SDN rules, each of the SDN rules comprising a packet field and a corresponding action to be performed by the SDN switch if a received packet matches the packet field.

18. The network device of claim 14, wherein the management engine is further configured to:
   compare the one or more performance metrics to respective thresholds; and
   upon determining that the at least one metric exceeds one of the respective thresholds, issue an alert to the SDN switch to perform a corrective action.

19. The network device of claim 18, wherein, in response to the alert, the SDN is configured to update a group table such that data previously assigned a first virtual port of a primary data link is assigned to a second virtual port of a backup data link.

* * * * *